Sept. 27, 1938. A. H. GOEPEL ET AL 2,131,509
COUPLING CONNECTION FOR PIPE JOINTS AND METHOD OF MAKING SAME
Filed April 22, 1937

INVENTORS
Arthur H. Goepel
BY Patrick F. Donahue
Harold F. Johnston
ATTORNEY

Patented Sept. 27, 1938

2,131,509

UNITED STATES PATENT OFFICE 2,131,509

COUPLING CONNECTION FOR PIPE JOINTS AND METHOD OF MAKING SAME

Arthur H. Goepel and Patrick F. Donahue, Waterbury, Conn.

Application April 22, 1937, Serial No. 138,347

6 Claims. (Cl. 29—157)

This invention relates to pipe couplings, and particularly to the packing element employed in couplings to connect the various types of joints for use with drain, vent, and other connections.

This invention is an improvement over the subject matter disclosed in Patent No. 2,037,625, issued to the same inventors, April 14, 1936.

The essential feature of the present development resides in the improved construction for permanently assembling a sealing washer or gasket to the end of a pipe at a connecting joint, the connection of the washer to the joint end of the pipe being completed in whole or in part at the place of manufacture of the pipe.

A further feature is the particular method employed in assembling the washer to the pipe end, and staking the same in position against rotation relative to the end of a pipe connection. The method of assembly resides particularly in the feature of having one of the pipe joint ends outwardly flared initially constructing the inside diameter of the washer, permitting its assembly over the flared end, and subsequently forcing and compressing the washer by a swaging operation until it closes snugly underneath the flared end of said pipe. This method of assembly not only results in a more economical cost of construction, but also conduces to produce a better sealing element at the pipe joint, as will hereinafter be more fully pointed out.

With these and other objects in view, there have been illustrated on the accompanying drawing two forms in which the invention may be conveniently embodied in practice.

Figure 1:
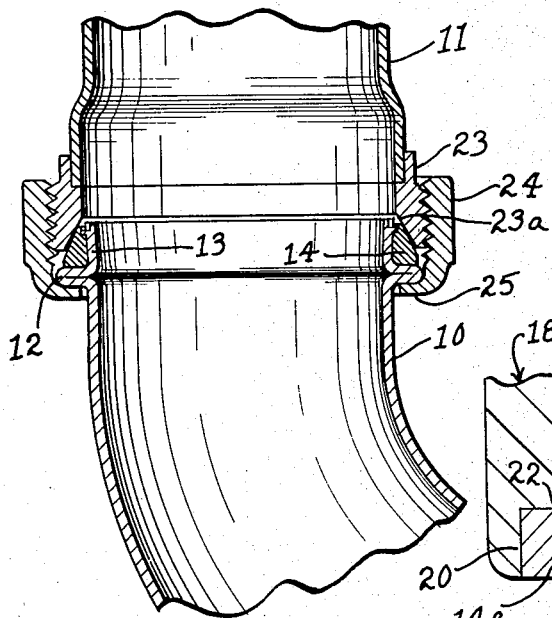
Fig. 1 represents a vertical sectional view through the union connection between two pipe ends, embodying the principles of the invention.

Referring now to the drawing, in which like numerals denote corresponding parts throughout the several views, the numeral 10 indicates one of the pipe ends, such as a J-bend, as is used in lavatory or sink connections, and the numeral 11 indicates the other pipe, such as a wall pipe to which the connection is made.

The upper end of the pipe end 10 is formed with an annular bead or flange 12 preferably formed outwardly from the metal wall of said pipe, a short distance below the end thereof, thus leaving a cylindrical neck 13 terminating the end of the tube. The flange 12 and neck 13 serve as a supporting means for a soft metal ring or sealing washer 14 preferably of lead, which is adapted to be assembled permanently at the source of manufacture in a manner herewith described.

Figure 2:
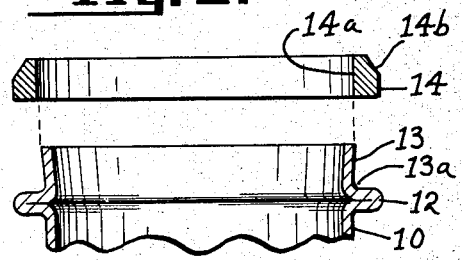
Fig. 2 is a fragmentary sectional view of one of the pipe ends, showing the relative construction and size of the soft metal sealing washer, with respect to the pipe end in position to be assembled thereupon.

As best shown in Fig. 2, the cylindrical neck 13 is flared slightly outwardly, and when taken in conjunction with the flange 12, defines an acute angular circumferential recess 13a thereabout. The sealing washer 14 is initially cast to the design as shown in Fig. 2, wherein the diameter of the inside wall 14a is able to readily slip over the largest diameter at the outermost edge of the cylindrical neck 13. The outside circumferential surface of the washer 14 is formed with a beveled section 14b, at substantially a 45 degree angle, the bevel extending down to about half the thickness of said washer 14.

Figure 3:
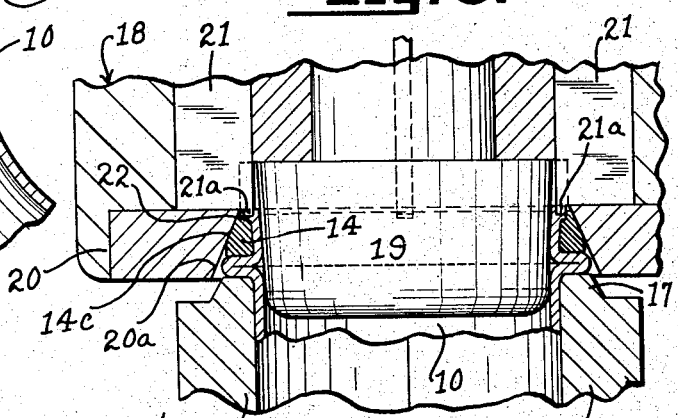
Fig. 3 is a similar view showing the washer in its completed assembled position in association with the tools for producing that operation.

The manner in which the washer 14 is permanently assembled into place in the preferred embodiment of the invention, and the tools for effecting such an assembly, are best shown in Fig. 3. The J-bend tube 10 or any other tube to which the invention may be applied, is first clamped between a pair of split jaws 15 and 16 which provide a circular anvil 17 at the upper end against which the annular flange of the pipe 13 is adapted to abut as a support. The washer as initially cast, as in Fig. 2, is then disposed upon the flange 12, the relative condition between the parts existing before the final assembly operation being clearly shown in the enlarged view in Fig. 5.

In order to form the washer 14 inwardly underneath the angular recess 13a, previously mentioned, a forming punch, generally indicated by the numeral 18, is provided, having a centering head 19 shaped to conform to the inner taper of the flared neck 13, and a die ring 20. The inner die forming surface 20a of the ring 20 is made at an angle less than the angle of the beveled surface 14b of the initial cast washer 14, with respect to the axis, so that when the forming punch 18 descends to effect the assembly, the die ring 20 will force and compress the washer 14 radially inwardly against and underneath the flared cylindrical neck 13 in a manner comparable to a swaging operation, and will simultaneously alter the outside contour of the washer 14, in changing the angle of the initial bevel 14b to a less angle from the axis, and will incidentally produce a greater beveled surface area 14c. (See Figures 3 and 5A.)

The above operation is furthermore conducive to changing somewhat the physical characteristics or structure of the washer 14, in that the reforming and compressive forces exerted by the die ring 20 upon the washer 14 will naturally produce a closer grained structure than when the sealing washer was originally cast. It will thus be seen that by so forming the washer, a higher grade sealing element is produced and held in permanent assembly to the end of the pipe, and when so done at the source of manufacture, will thus require no further operation on the part of the tradesmen.

Figures 5, 5A:
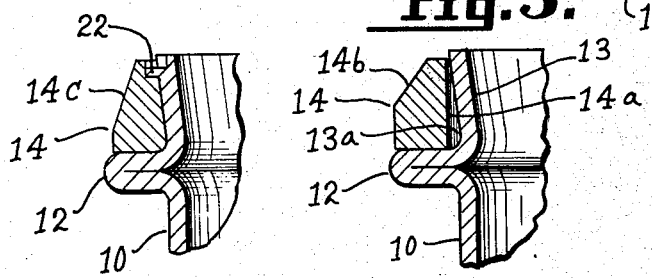
Fig. 5 is a fragmentary enlarged view of one section of the end of the pipe showing the washer in position ready for the forming operation.
Fig. 5A is a similar view to Fig. 5 after the forming operation showing the particular type of staking lug used in the construction.
Figure 4:
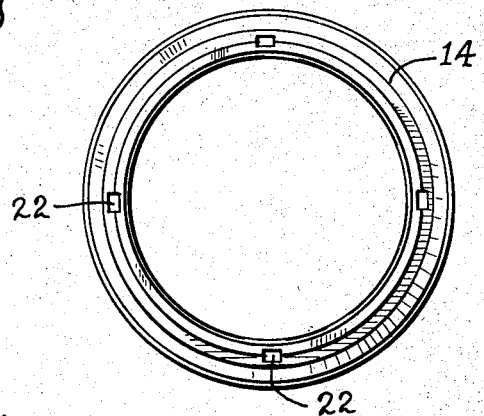
Fig. 4 is a top plan view of the same with the tools removed.

While it is not absolutely necessary, yet if it is desired to make further provision to more securely anchor the washer 14 in position, principally against rotation about the cylindrical neck 13, the striking tool 18 may be provided with one or more spaced cutter plates 21, four in this instance, having relatively blunt projecting shearing prongs 21a at the lower inner ends, the relative position of the prongs 21a in the forming tool being such that they (the prongs 21a) are adapted to strike into about half the metal thickness in the extreme upper annular edge of the cylindrical neck 13, shearing lugs 22 outwardly which embed themselves into the metal at the upper part of the washer 14 in a manner best shown in Fig. 5A.

The pipe 11, to which the union is to be made with the J-bend pipe 10, is required to have an exteriorly threaded bushing 23 secured thereto, which may be effected by a soldering operation. The inner surface of the bushing 23 is formed with a beveled surface 23a for sealing contact with a complementary beveled surface 14c of the washer 14. The pipe 10 is provided with the usual form of interiorly threaded coupling nut 24, the lower end being constructed with an inturned flange 25 for swivelly engaging the lower surface of the bead 12. This coupling nut 24 is adapted to threadedly engage the bushing 23 for coaxially drawing the two pipes 10 and 11 together and effecting a liquid tight seal therebetween by the cooperation of the bushing 23 with the washer 14.

Another feature of this invention resides in the fact that the angle of the interior beveled surface 23a of the bushing 23 is preferably made slightly greater than the angle of the finished beveled surface 14c of the washer 14 so that when the bushing 23 is drawn tightly against the washer 14, the beveled surface 23a of the bushing first engages against the uppermost part of the beveled washer surface 14b, and progressively descends downwardly in proportion to the amount of force that is exerted upon the coupling nut 24 in making the union between the pipes 10 and 11.

Figure 6:
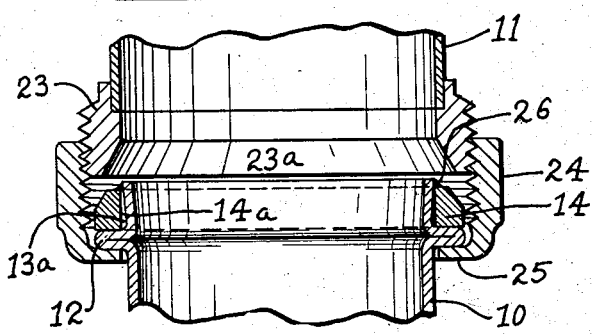
Fig. 6 is a vertical sectional view of the pipe connection, showing a modified embodiment of the invention.

In the modified embodiment of the invention, shown in Fig. 6, the construction is identical in all respects to the first form, except that there is no requirement for any tools to complete the assembly of the washer 14 underneath the tubular flared end 13 of the pipe 10; this assembly, however, being effected at the time the pipes 10 and 11 are joined together upon the first installation. In this modified construction the washer 14, as originally cast, is assembled around the flared end 13 of the pipe 10 resting upon the flange 12, and is so held in place by means of a ring or solder 26 disposed in the angular channel created between the upper adjacent surface of the washer 14 and the flared neck 13. It will be quite evident that when joining the pipes 10 and 11, by screwing up on the nut 24, the beveled surface 23a of the bushing 23 will force the washer 14 inwardly into the recess 13a, and at the same time compressing the washer 14 inwardly and changing the contour of the bevel 14a to more or less correspond with the bevel 23a of the bushing 23, thus effecting a liquid tight seal.

One of the advantages of the present preferred embodiment is that an inherently structurally better sealing washer is provided by reason of the assembly swaging operation, and an improved permanent connection is made between the washer and the end of the tube, with the minimum number of operations.

While there have been disclosed in this specification two forms, it is to be understood that these forms are shown for the purpose of illustration only, and that changes may be made in the described structure without departing from the spirit of the invention, the scope of which should be determined by reference to the following claims.

What is claimed is:

1. The herein described method of fabricating a sealing element at the end of a pipe connection having a slightly flared terminal section and a circumferential flange removed from the end of said pipe, which comprises initially forming a soft metallic washer with an inside diameter sufficiently large to clear the maximum diameter of said flared section, assembling said washer over said flared section to seat upon said flange, swaging said washer inwardly to reform its peripheral surface to a desired contour and drift the metal of the washer solidly underneath said flared portion, and forming lugs out of the upper edge of said pipe into an embedded state with the adjacent edge of said washer simultaneously with the swaging operation.

2. In a sealing joint construction for a coupling connection comprising a tubular pipe, a portion of said pipe adjacent the end being formed with a slight outwardly flared section, an integral outwardly formed flange positioned from the flared end of said pipe, and a metallic packing washer seated upon said flange and tightly embraced about the outside of said tapered portion said washer being held against relative rotation by means of one or more lugs formed downwardly and outwardly from the annular end of said flared section into an embedded state in the adjacent end of said washer.

3. In a sealing joint construction for a coupling connection comprising a tubular pipe, a portion of said pipe adjacent the end being formed with a slight outwardly flared section, an integral outwardly formed flange positioned from the flared end of said pipe, and a metallic packing washer seated upon said flange and tightly embraced about the outside of said tapered portion said washer being held against relative rotation by means of one or more lugs sheared downwardly out of substantially one-half of the metal thickness of said flared section into an embedded state into the upper edge of said washer.

4. In a sealing joint construction for a coupling connection comprising a tubular pipe, an integral outwardly formed flange on said pipe spaced from the end thereof, and a metallic packing washer seated upon said flange and tightly embraced about the outside of said tapered portion, said washer being held against movement by means of one or more lugs sheared downwardly out of substantially one-half of the metal thickness of the outer end of said pipe beyond said flange into an embedded state into the upper edge of said washer.

5. The method of forming a pipe joint element from a pipe having an outflaring end portion and an outstanding annular flange at the base of the flare which comprises placing a deformable metal washer on said flange, and permanently deforming the washer in a die to cause the metal thereof to flow against said flange and the outside of the pipe, said deforming simultaneously shaping the outside of the washer with a long taper to engage with a second element of the pipe joint and seal the joint.

6. As an article of manufacture an element for forming a pipe joint comprising a pipe having an outflaring end portion and an outstanding annular flange at the base of the flare, and a deformable metal washer placed on said flange and permanently deformed in a die to cause the metal thereof to flow against said flange and the outside of the pipe, the outside of the washer being shaped simultaneously by said deforming to provide a long taper to engage with a second element of the pipe joint and seal the joint.

ARTHUR H. GOEPEL.
PATRICK F. DONAHUE.